United States Patent
Mihailescu et al.

(10) Patent No.: US 11,919,586 B2
(45) Date of Patent: Mar. 5, 2024

(54) METHOD FOR OPERATING AN ACTUATOR FOR A MOTOR VEHICLE, RESPECTIVE ACTUATOR AND METHOD FOR OPERATING AN ARRANGEMENT OF AN ACTUATOR AND A CONTROL UNIT FOR A MOTOR VEHICLE

(71) Applicants: Audi AG, Ingolstadt (DE); Dr. Ing. h.c. F. Porsche Aktiengesellschaft, Stuttgart (DE)

(72) Inventors: Adrian Mihailescu, Ingolstadt (DE); Moritz Baber, Stuttgart (DE)

(73) Assignees: AUDI AG, Ingolstadt (DE); DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 183 days.

(21) Appl. No.: 17/654,903

(22) Filed: Mar. 15, 2022

(65) Prior Publication Data

US 2022/0297750 A1     Sep. 22, 2022

(30) Foreign Application Priority Data

Mar. 17, 2021   (DE) ................ 10 2021 202 587.0

(51) Int. Cl.
    *B62D 6/00*     (2006.01)
(52) U.S. Cl.
    CPC ..................... *B62D 6/00* (2013.01)

(58) Field of Classification Search
    CPC ........................................... B62D 6/00
    See application file for complete search history.

(56) References Cited

U.S. PATENT DOCUMENTS

| | | |
|---|---|---|
| 8,308,174 B2 | 11/2012 | Muth et al. |
| 8,494,718 B2 | 7/2013 | Muth et al. |
| 2006/0247838 A1 | 11/2006 | Bauer |
| 2010/0241314 A1 | 9/2010 | Bohm et al. |
| 2021/0237770 A1 | 8/2021 | Kawakami |

FOREIGN PATENT DOCUMENTS

| | | |
|---|---|---|
| DE | 112018007796 T5 | 4/2021 |
| EP | 2 164 746 A1 | 3/2010 |
| WO | 97/39905 A1 | 10/1997 |
| WO | 2005/007489 A1 | 1/2005 |

*Primary Examiner* — Mathew Franklin Gordon
(74) *Attorney, Agent, or Firm* — Pearne & Gordon LLP

(57) ABSTRACT

The application relates to a method for operating an actuator for a motor vehicle, the actuator having an actuating drive and a signal input. The actuating drive is operated as a function of a setpoint value received via the signal input and a threshold value stored in the actuator for setting an actual value of the actuator to the setpoint value, wherein the threshold value is set equal to the setpoint value when the actuator leaves an operating range of the actuator defined by the threshold value of the setpoint value. The application further relates to an actuator for a motor vehicle and a method for operating an arrangement of an actuator and a control unit for a motor vehicle.

10 Claims, 1 Drawing Sheet

METHOD FOR OPERATING AN ACTUATOR FOR A MOTOR VEHICLE, RESPECTIVE ACTUATOR AND METHOD FOR OPERATING AN ARRANGEMENT OF AN ACTUATOR AND A CONTROL UNIT FOR A MOTOR VEHICLE

CROSS REFERENCE TO RELATED APPLICATION

This application claims the benefit of German Application No. 10 2021 202 587.0, filed on Mar. 17, 2021, the entire disclosure of which is hereby incorporated herein by reference.

FIELD OF THE INVENTION

The invention relates to a method for operating an actuator for a motor vehicle, which has an actuating drive and a signal input. The invention further relates to an actuator for a motor vehicle and a method for operating an arrangement of an actuator and a control unit for a motor vehicle.

BACKGROUND OF THE INVENTION

The publication WO 97/39905 A1, for example, is known from the prior art. This describes an active suspension system, in particular for vehicles with supporting units, each of which has an actively lift-adjustable actuator and a passive spring arranged in series with it, and preferably a damper arranged at least parallel to the spring. Lift, pitch, roll, longitudinal and lateral acceleration of the body can be determined using various acceleration sensors. The lifting positions of the supporting units are registered by way of displacement sensors. A signal evaluation is described which enables achieving a predefinable suspension characteristic.

BRIEF SUMMARY OF THE INVENTION

The object of the invention is to propose a method for operating an actuator for a motor vehicle, which method has advantages over known methods, in particular allowing the actuator to be installed in different motor vehicles or for different motor vehicle model series without adapting the actuator to the respective motor vehicle.

According to the invention, this is achieved with a method for operating an actuator for a motor vehicle having the features of claim 1. The actuator is operated as a function of a setpoint value received via the signal input and a threshold value stored in the actuator for setting an actual value of the actuator to the setpoint value, wherein the threshold value is exceeded when the actuator leaves an operating range of the actuator defined by the threshold value of the setpoint value is set equal to the setpoint value.

Advantageous configurations with expedient further developments of the invention are specified in the dependent claims.

The actuator serves to mechanically adjust or mechanically drive a device in the motor vehicle. For this purpose, the actuator has the actuating drive, by means of which a drive torque can be or is generated at least temporarily. The actuator is present in the form of an electric motor, for example. In addition, the actuator can have an optional transmission. The actuator has a signal input for controlling the actuator. A setpoint value is supplied to the actuator via the signal input, for example from a control unit. After receiving the setpoint value, the actuator is operated until the actual value of the actuator matches the setpoint value. The actual value and the setpoint value are to be understood, for example, as positions, in particular angular positions, of the actuator or of the actuating drive and/or of the device to be set by means of the actuator, or equivalent values.

When operating the actuator, the threshold value is used in addition to the setpoint value. The threshold value is used to define the operating range of the actuator, i.e., the range within which the actuator can or may be operated. In particular, the threshold value defines a limit of the operating range, which the actual value of the actuator must not exceed, since exceeding it in this way would result in damage to the actuator and/or the device, for example. For example, during the operation of to actuating drive, the actuating drive is to be deactivated in good time before the actual value reaches the threshold value. However, the actuating drive is intended to be operated at a higher speed away from the threshold value and at a lower speed in the region of the threshold value, such that a high actuating speed of the actuator on the one hand and a high level of safety are achieved on the other hand.

The threshold value may be permanently stored in the actuator. However, the same actuator is usually used for different motor vehicles, in particular for different motor vehicle model series. This means that each actuator has to be adapted to the respective motor vehicle, in particular by storing the threshold value in the actuator. As a result, actuators must be provided for different motor vehicles or motor vehicle model series, which only differ with respect to their threshold value. This means that for each motor vehicle or each motor vehicle model series, the respective actuator must be adapted and provided with appropriate software in which the threshold value is stored. This results in high development costs as well as manufacturing costs or storage costs.

For this reason, according to the invention, the actuator is designed to be self-learning, so that the actuator automatically adapts to the respective motor vehicle. This is achieved by setting the threshold value as a function of the setpoint value supplied to the actuator via the signal input. If the setpoint value is outside the operating range of the actuator defined by the previous threshold value, a new threshold value is set equal to the setpoint value and stored as a threshold value in the actuator, replacing the previous threshold value.

The actuator is preferably reset when it is installed in the motor vehicle, wherein the threshold value is set to an initial value. In this case, the initial value corresponds to a small, in particular minimal, operating range of the actuator, preferably an operating range of zero. The threshold value, which is set equal to the initial value, initially would not allow the actuator to move outside the initial value. However, as soon as the setpoint value is supplied to the actuator via the signal input and this is outside the operating range defined by the threshold value, the threshold value is set equal to the setpoint value. Accordingly, the actual value can subsequently be shifted up to the setpoint value, so that the actual value can be, and is, adjusted to the setpoint value by respectively responding to the actuating drive.

The adjustment of the threshold value to the setpoint value and thus the adjustment of the actuator to its permissible operating range thus takes place adaptively or successively. As a result, it is no longer necessary to adapt the actuator to different motor vehicles or motor vehicle model series. Instead, the actuator is adjusted during the operation of the actuator in the motor vehicle. Accordingly, there are clear advantages in terms of development and adaptation costs as well as provision and storage costs.

In particular, the threshold value is set equal to the setpoint value if the setpoint value exceeds or falls below the threshold value. If the threshold limits the operating range of the actuator upwards, i.e., in the direction of larger values, then the threshold value is set equal to the setpoint value if the setpoint value exceeds the threshold value. But if the threshold value limits the operating range of the actuator downwards, i.e., in the direction of smaller values, then the threshold value is set equal to the setpoint value if the setpoint value falls below the threshold value. This achieves a step-by-step adjustment of the threshold value, and therefore of the operating range, to the setpoint value specified via the signal input.

The operating range of the actuator is preferably defined by the threshold value and another threshold value. In particular, the threshold value limits the operating range in a first direction and the other threshold value limits it in a second direction that differs from the first direction. To this extent, the operating range is between the threshold value and the other threshold value. For example, the operating range is limited in the direction of higher values by the threshold value and in the direction of lower values by the other threshold value, or vice versa. The threshold value can also be referred to as the first threshold value and the other threshold value as the second threshold value.

When using multiple threshold values, i.e. in particular the threshold value and the other threshold value or the first threshold value and the second threshold value, that threshold value is set equal to the setpoint value on whose side the setpoint value has left the operating range when the setpoint value leaves the operating range of the actuator defined by the threshold values. For example, when the setpoint value exceeds the threshold value, the threshold value is set equal to the setpoint value, and if the setpoint value falls below the other threshold value, the other threshold value is set equal to the setpoint value, or vice versa. As a result, the operating range of the actuator is successively expanded and the threshold values are adapted to the range in which the setpoint values occur.

In a further development of the invention, the actuating speed of the actuating drive is reduced as the distance between the actual value and the threshold value decreases. The actuating speed is the speed at which the actuator changes the actual value. If the actual value is in the form of the angular position, the actuating speed corresponds to an angular speed. If the distance between the actual value and the threshold value is greater, a greater actuating speed is selected than if the distance is smaller. This achieves a reliable and precise approach to the setpoint value by the actual value and in particular prevents the setpoint value from being exceeded by the actual value. In other words, it is provided that the actuating speed is further reduced the smaller the distance between the actual value and the threshold value becomes. Vice versa, the actuating speed is further increased the greater the distance between the actual value and the threshold value becomes. This means that on the one hand the setpoint value is quickly approached by the actual value, but on the other hand the actual value reliably prevents leaving the operating range.

If the operating range is limited by multiple threshold values, in particular by the threshold value and the other threshold value, the actuating speed of the actuator is of course reduced as the distance to the threshold value closest to the actual value decreases. In this respect, the highest actuating speed is present, for example, at an actual value lying in the middle between the threshold values. Away from this highest actuating speed, the actuating speed is reduced in both directions, i.e. in the direction of each of the threshold values.

In any case, the actuating speed is reduced in particular in such a way that it is ensured that the actual value is or can be set reliably and precisely to the setpoint value. However, the actuating speed is preferably reduced only to the extent that this condition is met, so that the actual value can continue to be set quickly to the setpoint value.

In a further development of the invention, the actual value is limited to the threshold value. This has already been pointed out. The threshold value limits the operating range of the actuator, wherein it is undesirable for the actual value to leave the operating range and should therefore be prevented. The actuator is therefore adjusted or operated in such a way that the actual value is always within the operating range and, accordingly, the actual value does not leave the operating range.

At the beginning of the operation of the actuator, the adjustment range of the actuator is limited by the threshold value, wherein the limit is widened over time. The procedure described enables reliable and safe operation of the actuator independently of the motor vehicle or the motor vehicle model series and flexible use of the actuator by teaching the actuator using the setpoint value.

In a further development of the invention, the threshold value, which is set equal to the setpoint value, is stored in the actuator in a non-volatile memory. The threshold value or the plurality of threshold values should therefore be stored in such a way that they survive a currentless state of the actuator. In this respect, it is not intended for the actuator to be taught again each time the motor vehicle starts to operate, but instead the actuator should be taught persistently or the threshold value or threshold values should be stored persistently. In particular, the threshold value or the threshold values should be stored persistently over KL15 and/or KL30 switches. The KL15 switch is to be understood as an activation or deactivation of an ignition of the motor vehicle and the KL30 switch as an activation or deactivation of a power supply of the motor vehicle. For this purpose, the threshold value(s) is/are stored in the non-volatile memory of the actuator. This procedure has the advantage that the teaching only takes place once and does not have to be carried out again after completion.

In a further development of the invention, the actuator compares an identifier received via the signal input with an identifier stored in the actuator, and if the identifier deviates from the stored identifier, the threshold value is reset to an initial value. The identifier is to be understood as an identification of the motor vehicle and/or a control unit of the motor vehicle, for example. For example, the identifier is transmitted to the actuator when the motor vehicle starts operating, in particular via the signal input. In addition, the identifier may be transmitted to the actuator multiple times, in particular regularly, during operation of the actuator or the motor vehicle.

Preferably, the identifier received via the signal input is stored in the actuator if no identifier has yet been stored in the actuator or if the received identifier differs from the stored identifier. As a result, the actuator is coupled to the motor vehicle or the control unit, so that the actuator can then recognize whether it is still being operated together with the motor vehicle or the control unit, or whether it has been installed in another motor vehicle or connected to a different control unit.

In any case, if the identifier is stored in the actuator, the threshold value is reset to the initial value. In this case, the initial value is selected in particular in such a way that only a small operating range is permitted for the actual value, or in such a way that the actuator is fixed. If there are multiple threshold values, each of these threshold values may be reset to the same initial value. However, a separate initial value may be stored for each of the threshold values, wherein these separate initial values are different from one another.

The procedure described makes it possible to use the actuator flexibly between different motor vehicles and, for example, to remove the actuator from a first motor vehicle and install it in a second motor vehicle. In this case, the operating range adapted to the first motor vehicle should not be used for operating the actuator, but the operating range should be adapted to the second motor vehicle.

In a further development of the invention, the actuator is used to drive a rear-axle steering system of the motor vehicle. To this extent, the motor vehicle has multiple steerable axles, namely a steerable front axle and a steerable rear axle. While the front axle is steered in the usual way, the actuator is provided for setting a steering angle on the rear axle. The setpoint value, the actual value, and the threshold value of the actuator are preferably in the form of steering angles or equivalent values. The procedure described for operating the actuator enables the use of one and the same actuator for the rear-axle steering of different motor vehicles or different motor vehicle model series. The actuator does not have to be adapted to the respective motor vehicle or the respective motor vehicle model series, so that a particularly low development effort can be achieved.

The invention also relates to an actuator for a motor vehicle, in particular for carrying out the method according to the statements in the context of the present description, which actuator has an actuating drive and a signal input. The actuator is intended and designed to operate the actuating drive as a function of a setpoint value received via the signal input and a threshold value stored in the actuator for setting an actual value of the actuator to the setpoint value, wherein the threshold value is set equal to the setpoint value when the actuator leaves an operating range of the actuator defined by the threshold value of the setpoint value.

The advantages of such a configuration of the actuator or such a procedure have already been pointed out. Both the actuator and the method for operating it can be further developed in accordance with the statements made within the scope of this description, so that reference is made to them in this respect.

The invention also relates to a method for operating an arrangement of an actuator and a control unit for a motor vehicle, in particular using the method for operating the actuator according to the statements in this description, wherein the actuator has an actuating drive and a signal input. The actuator is operated as a function of a setpoint value received via the signal input and a threshold value stored in the actuator for setting an actual value of the actuator to the setpoint value, wherein the threshold value is set equal to the setpoint value when the actuator leaves an operating range of the actuator defined by the threshold value of the setpoint value.

As for the advantages and possible advantageous embodiments, reference is once again made to the explanations within the scope of this description.

In a further development of the invention, a maximum setpoint value is stored in the control unit and the threshold value stored in the actuator is set to an initial value that differs from the maximum setpoint value. The maximum setpoint value is matched to the respective motor vehicle, i.e. it corresponds to the maximum setpoint value that can be set for the motor vehicle. The initial value, on the other hand, is selected in such a way that the actuator can be used for different motor vehicles or different motor vehicle model series. Together with the procedure already described, this has the advantage that the actuator is taught to the control unit or the motor vehicle during its operation, and a separate adjustment of the actuator is accordingly eliminated.

In a further development of the invention, a preset value within a value range limited by the maximum setpoint is transmitted to the actuator as the setpoint, so that the threshold value adjusts to the maximum setpoint, in particular step by step. During the operation of the arrangement or of the motor vehicle, different preset values lying within the value range are selected and transmitted to the actuator as a setpoint value. The default value is selected, for example, based on a steering angle of the motor vehicle specified by a driver of the motor vehicle.

If the setpoint value transmitted to the actuator is outside the operating range currently defined by the threshold value, the threshold value is set equal to the setpoint value and the actuator is then operated by the actual value to approach the setpoint value. This causes the threshold value to adjust to the maximum setpoint value over time, until it finally matches it.

It may be intended that the control device transmits a preset value corresponding to the maximum setpoint value to the actuator as the setpoint value when it is put into operation. In this case, the threshold is immediately set equal to the maximum setpoint value. However, the threshold value is usually adjusted to the maximum setpoint value during normal operation of the arrangement or of the motor vehicle, so that multiple steps are necessary until the threshold value matches the maximum setpoint value. In any case, a reliable adjustment of the threshold value to the maximum setpoint value and a respective adjustment of the actuator to the motor vehicle are achieved.

The features and feature combinations described in the description, in particular the features and feature combinations described in the following description of the figures and/or shown in the figures, can be used not only in the combination specified in each case, but also in other combinations or on their own, without leaving the scope of the invention. The invention is therefore also to be regarded as encompassing embodiments which are not explicitly shown or explained in the description and/or the figures, but emerge from the explained embodiments or can be derived therefrom.

BRIEF DESCRIPTION OF THE DRAWINGS

The invention is explained in more detail using the exemplary embodiments illustrated in the drawing, without restricting the invention. Wherein.

DESCRIPTION OF EXAMPLE EMBODIMENTS

Figure 1:
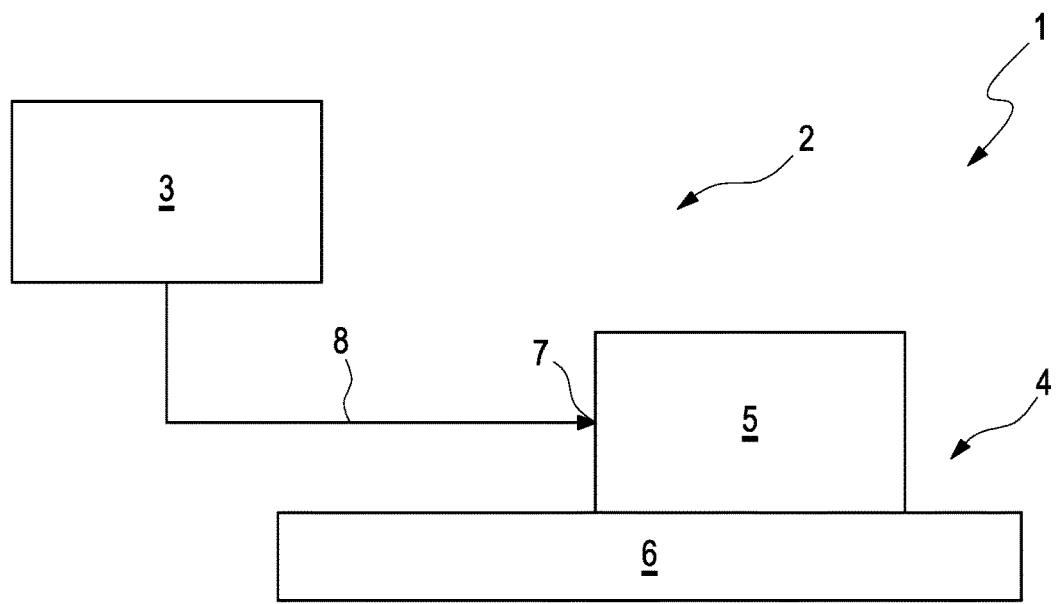
FIG. 1 shows a schematic view of a region of a motor vehicle, more precisely an arrangement of an actuator and a control unit of the motor vehicle.

FIG. 1 schematically shows a region of a motor vehicle 1, specifically an arrangement 2 of the motor vehicle 1, which comprises a control unit 3 of the motor vehicle 1 and an actuator 4. The actuator 4 is used in particular to actuate a rear-axle steering system of the motor vehicle 1. It comprises an actuating unit 5 and an actuating drive 6. The actuating unit 5 is used to actuate the actuating drive 6 in accordance with a setpoint value which is supplied to the actuator 4 by the control unit 3 via a signal input 7, in particular via a signal line 8. The actuator 6 is intended and designed for providing a mechanical drive force or a mechanical drive torque. In the exemplary embodiment shown here, the actuator forms part of the rear-axle steering system of the motor vehicle 1 or is at least connected to it in terms of drive technology.

It is intended that the control unit 3 is specifically adapted to the motor vehicle 1 when the motor vehicle 1 starts operating, i.e. when the motor vehicle 1 is put into operation for the first time, while the actuator 4 is generic. This means that the actuator 4, unlike the control unit 3, is not matched to the motor vehicle 1. Instead, such an adjustment should only take place during the operation of the motor vehicle 1 or the arrangement 2. A maximum setpoint value is stored in control unit 3, which limits a value range within which the setpoint value transmitted from control unit 3 to actuator 4 lies or may lie. The maximum setpoint value is matched to the respective motor vehicle 1.

In contrast, a threshold value which corresponds to an initial value at the start of operation is stored in the actuator 4. The initial value and thus the initial threshold value is selected in such a way that the actuator 4 can be used for different motor vehicles 1 or different motor vehicle model series.

The actuator 4 or its actuating drive 6 are operated as a function of the setpoint value received via the signal input 7. In addition, the threshold value is used. In particular, an actual value of the actuator is changed by appropriately adjusting the actuator 6 in the direction of the setpoint value or to set it to the setpoint value. In this case, however, the actual value is limited by the threshold value which defines an operating range of the actuator 4. This means that while the actuator 4 is being operated, the actual value should not leave the operating range delimited by the threshold value, or is limited to it. In addition, as the distance between the actual value and the threshold value decreases, an actuating speed of the actuator is reduced in order to prevent the actual value from exceeding the threshold value.

The operating range of the actuator 4 is particularly preferably limited by multiple threshold values. For this purpose, there is another threshold value, which can also be referred to as the second threshold value, in addition to the threshold value, which can also be referred to as the first threshold value. This means that the operating range is limited on opposite sides by the threshold values, so that the threshold values sandwich the operating range. For example, one of the threshold values is positive and another of the threshold values is negative. In any case, the threshold values are different from each other.

Figure 2:
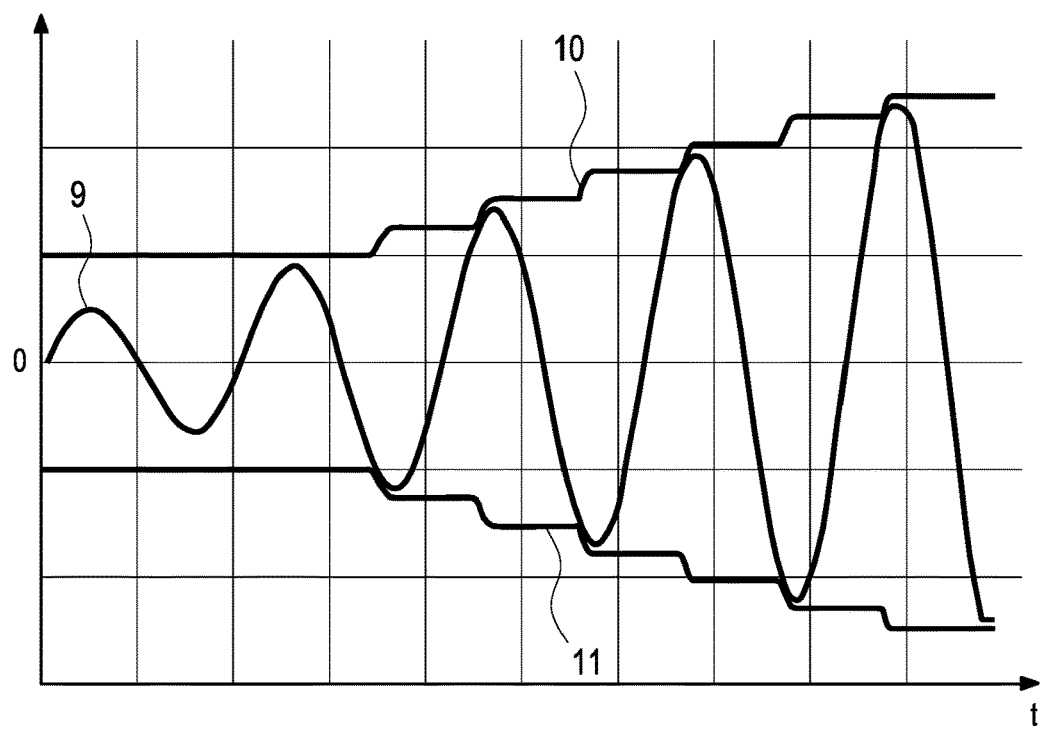
FIG. 2 shows a diagram in which a setpoint value transmitted to the control device, a threshold value and a further threshold value are plotted over time.

FIG. 2 shows a diagram in which curves 9, 10 and 11 are plotted over the time t. Curve 9 describes the curve of the setpoint value supplied to actuator 4 via the signal input 7, curve 10 is the curve of the first threshold value, and curve 11 is the curve of the second threshold value. Initially, the first threshold value corresponds to a first initial value and the second threshold value corresponds to a second initial value. For example, the first output value is positive and the second output value is negative. Purely by way of example, a sinusoidal curve 9 is specified for the setpoint value, wherein its amplitude increases over time. First, the setpoint value is completely within the operating range of the actuator 4 defined by the threshold values.

Over time, however, setpoint values occur that are outside the operating range, that is to say, they exceed the first threshold value or fall below the second threshold value. If the setpoint value exceeds the first threshold value, the first threshold value is set equal to the setpoint value and the actual value is changed in the direction of the setpoint value, in particular up to the setpoint value, by operating the actuating drive 5. But if the setpoint value falls below the second threshold value, the second threshold value is set equal to the setpoint value and the actual value is changed in the direction of the setpoint value, in particular up to the setpoint value, by operating the actuating drive 5.

As a result, the distance between the two threshold values increases steadily over time until the operating range of actuator 4 defined by the threshold values corresponds to an operating range or value range stored in control unit 3. In this respect, at least one maximum setpoint value is stored in control unit 3, to which the first threshold value adapts. Of course, a minimum setpoint value is preferably also stored, to which the second threshold value adapts over time. The minimum setpoint value and the maximum setpoint value limit a value range within which the control unit 3 selects a default value and transmits it to the actuator 4 as setpoint value.

The procedure described has the advantage that the actuator 4 only has to be kept avail-able in a generic form and not in a form tailored to the motor vehicle 1. In this respect, the actuator 4 is adaptively adapted to the motor vehicle 1 while the motor vehicle 1 is in operation. Expensive adjustment operations of the actuator 4 can be eliminated. At the same time, manufacturing costs and storage costs for the actuator 4 are reduced.

LIST OF REFERENCE NUMERALS 1 motor vehicle
2 arrangement
3 control unit
4 actuator
5 actuating unit
6 actuating drive
7 signal input
8 signal line
9 curve
10 curve
11 curve

The invention claimed is:

1. A method for operating an actuator for a motor vehicle, said actuator having an actuating drive and a signal input, wherein the actuating drive is operated as a function of a setpoint value received via the signal input and a threshold value stored in the actuator for setting an actual value of the actuator to the setpoint value, wherein the threshold value is set equal to the setpoint value when the actuator leaves an operating range of the actuator defined by the threshold value of the setpoint value.

2. The method according to claim 1, wherein an actuating speed of the actuator is reduced with decreasing distance between the actual value and the threshold value.

3. The method according to claim 1, wherein the actual value is limited to the threshold value.

4. The method according to claim 1, wherein the threshold value set equal to the setpoint value is stored in the actuator in a non-volatile memory.

5. The method according to claim 1, wherein the actuator compares an identifier received via the signal input with an identifier stored in the actuator, and if the identifier deviates from the stored identifier, the threshold value is reset to an initial value.

6. The method according to claim 1, wherein the actuator is used for driving a rear-axle steering of the motor vehicle.

7. An actuator for a motor vehicle for carrying out the method according claim 1, said actuator having an actuating drive and a signal input, wherein the actuator is intended and designed for operating the actuating drive as a function of a setpoint value received via the signal input and a threshold value stored in the actuator for setting an actual value of the actuator to the setpoint value, wherein the threshold value is set equal to the setpoint value when the actuator leaves an operating range of the actuator defined by the threshold value of the setpoint value.

8. A method for operating an arrangement composed of an actuator and a control unit for a motor vehicle, wherein the actuator has an actuating drive and a signal input, wherein the actuating drive is operated as a function of a setpoint value received via the signal input from the control unit and a threshold value stored in the actuator for setting an actual value of the actuator to the setpoint value, wherein the threshold value is set equal to the setpoint value when the actuator leaves an operating range of the actuator defined by the threshold value of the setpoint value.

9. The method according to claim 8, wherein a maximum setpoint value is stored in the control unit and the threshold value stored in the actuator is set to an initial value that differs from the maximum setpoint value.

10. The method according to claim 9, wherein a preset value within a value range limited by the maximum setpoint is transmitted to the actuator as the setpoint, so that the threshold value adjusts to the maximum setpoint value.

* * * * *